Oct. 18, 1932.　　　　A. VOIGT　　　　1,883,172
LOCK
Filed Nov. 2, 1929　　　3 Sheets-Sheet 1
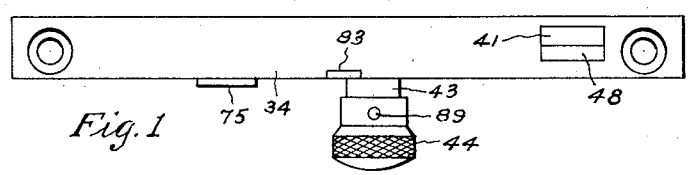
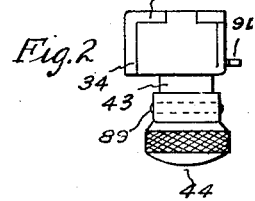
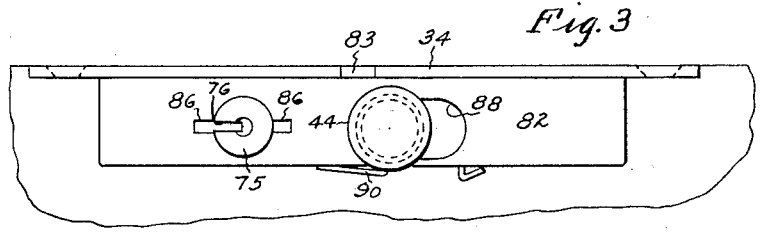
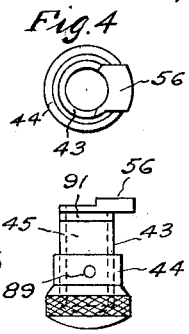
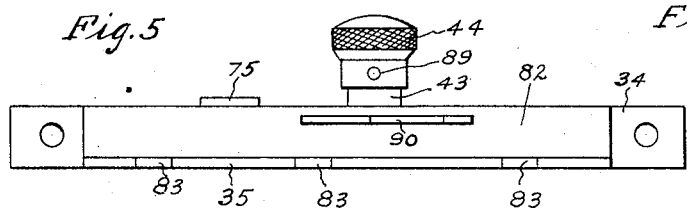
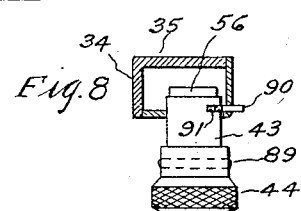
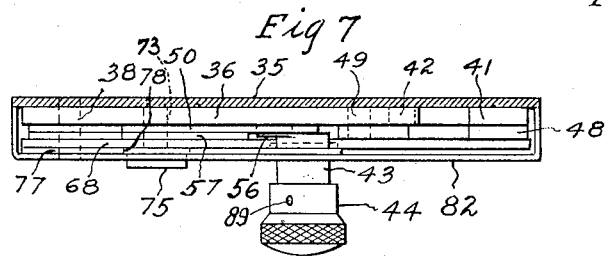
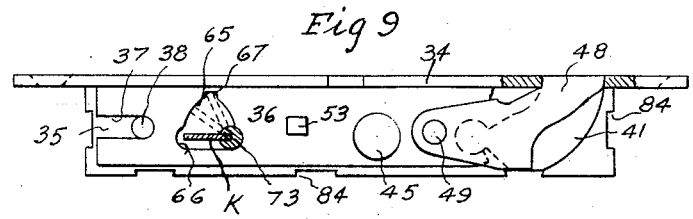
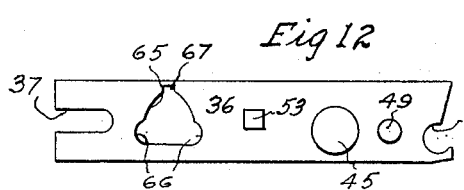
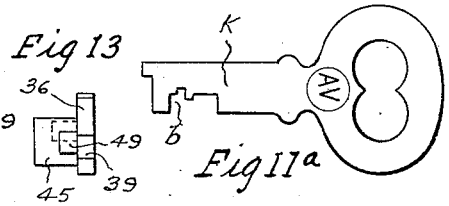
INVENTOR
Albert Voigt
BY John A. Seifert
ATTORNEY

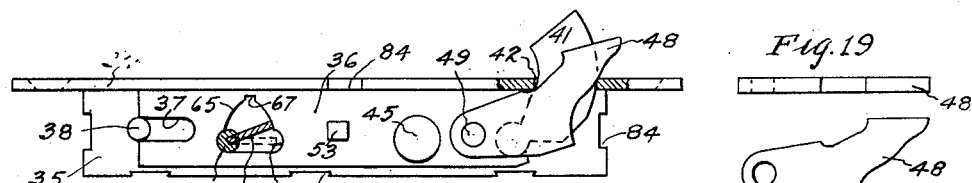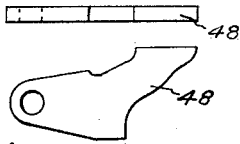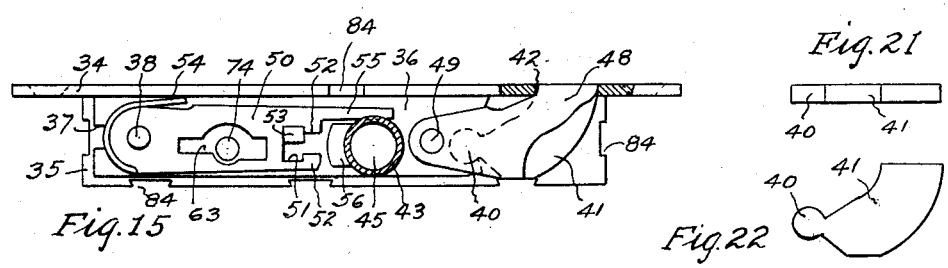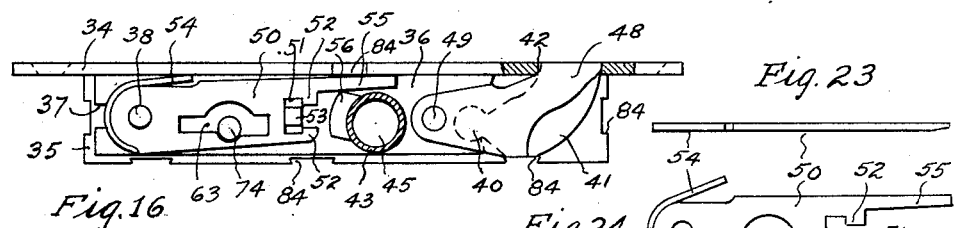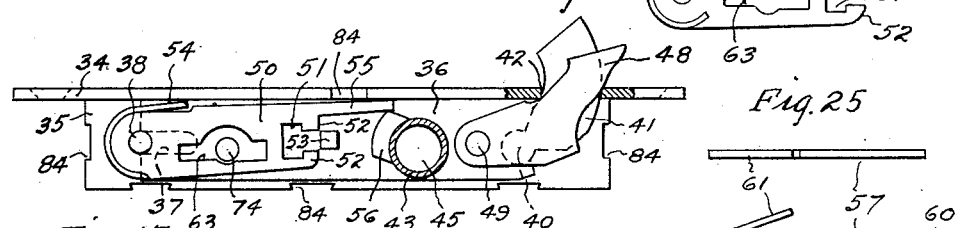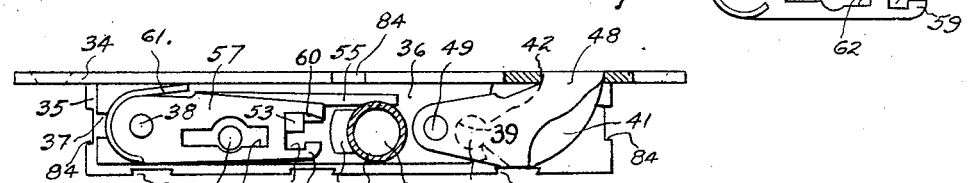

Oct. 18, 1932.  A. VOIGT  1,883,172
LOCK
Filed Nov. 2, 1929   3 Sheets-Sheet 3

INVENTOR
Albert Voigt
BY John A. Seifert
ATTORNEY

Patented Oct. 18, 1932

1,883,172

UNITED STATES PATENT OFFICE

ALBERT VOIGT, OF NEW YORK, N. Y.

LOCK

Application filed November 2, 1929. Serial No. 404,244.

This invention relates to locks, and particularly to key operated locks used in connection with sliding doors for display cases and the like, wherein doors are slidable one relative to the other, and it is an object of the invention to provide a lock having a spreading bolt construction adapted to cooperate with a keeper to positively lock the door against movement, in which the number of working parts is reduced and produces a high efficiency in operation.

Another object of the invention is to provide a lock wherein the bolt is moved to locking position by a hand manipulable knob, and as the bolt is moved to locking position means are automatically operative to cooperate with the bolt carrier to secure and lock it with the bolt in locking position and against manipulation by the knob to move the carrier to unlocking position, said means being operative by a key to move the same to releasing position and permit of actuation of the bolt carrier to unlocking position by the knob.

A further object of the invention relates to an improved constructed and arranged casing comprising a pair of sections, one section being adapted for the mounting of the operative lock parts thereon, and the other section to retain the parts assembled, the casing being arranged to enclose the operative parts and to mount the lock in a mortise.

The embodiment of the invention illustrated comprises a casing arranged at one side edge with a face plate extending longitudinally of the casing and having an opening therein for the passage of a pair of bolts slidably supported within the casing by a carrier to have movement longitudinally of the casing and the bolts are adapted to engage the edges of the face plate opening to transform the longitudinal movement of the carrier into movement in a direction transversely to the longitudinal movement of the carrier and produce the spreading apart of the bolts due to the curvature of the bolt edges, engaging during said spreading movement of the bolts through the opening in a keeper. Sliding movement is manually imparted to the bolt carrier and the bolts are secured within the casing and in the locking positions by latch members pivotally mounted in the casing in superposed relation to the bolt carrier, with one of the latch members yieldingly engaging a projection of the bolt carrier in all positions of the bolts preventing longitudinal movement of the same and is adapted to be disengaged from the carrier projection by the means for manually moving the bolt carrier. The other latch member is arranged to permit longitudinal movement of the bolt carrier in a direction to position the bolts in locking engagement with the keeper during the disengagement of the first latch member from the bolt carrier projection, but is yieldingly urged into engagement with the bolt carrier projection when the bolts engage the keeper preventing return or unlocking movement thereof. The locking latches for the bolt carrier are arranged to be moved out of locking position to permit the bolts to be moved from locking engagement with the keeper by a key adapted to engage and actuate the second latch member from engagement with the bolt carrier projection, the key also engaging the bolt carrier and first latch member simultaneously to actuate the first latch from engagement with the bolt carrier projection to permit actuation of the bolt carrier to move the bolts from locking position with the keeper.

In the drawings accompanying and forming a part of this application, Figure 1 is a side elevation of the lock looking at the face plate side of the casing.

Figure 2 is an end view of the casing looking at the right of Figure 1.

Figure 3 is a plan view looking at the bottom of Figure 1 and showing the manner of mounting on a door.

Figure 4 is an end view of a knob to actuate the bolt carrier and bolts.

Figure 5 is a side elevation looking at the side opposite to that shown in Figure 1.

Figure 6 is a side elevation of the knob shown in and looking at the bottom of Figure 4.

Figure 7 is a longitudinal sectional view of the lock in the Figure 1 position.

Figure 8 is a cross-sectional view of the casing showing the means to retain the knob therein.

Figure 9 is a plan view with part of the casing removed showing the bolts and carrier therefor with the bolts in unlocking position.

Figure 10 is a side view of a key supporting barrel.

Figure 11 is an end view of the key supporting barrel looking at the bottom of Figure 10.

Figure 11ª is a view of a key to actuate the lock.

Figure 12 is a plan view of the bolt carrier.

Figure 13 is an end view of the bolt carrier looking at the right of Figure 12.

Figure 14 is a view similar to Figure 9 showing the bolts in locking position.

Figure 15 is a view similar to Figure 9 showing a latch member securing the bolts in unlocking position.

Figure 16 is a view similar to Figure 15 showing the latch member actuated from bolt securing position.

Figure 17 is a view similar to Figure 16 showing the bolts moved to locking position.

Figure 18 is a view similar to Figure 15 arranged with a second latch member.

Figures 19 and 20 are side and plan views of one of the bolts.

Figures 21 and 22 are side and plan views of the other bolt.

Figure 23 is a side view and Figure 24 a plan view of the first latch member.

Figures 25 and 26 are side and plan views of the second latch member.

Figure 27:
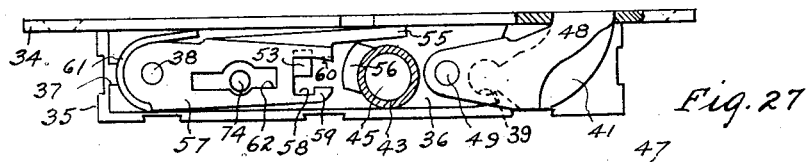

Figure 27 is a view similar to Figure 18 showing the first latch member actuated from bolt securing position.

Figure 28:
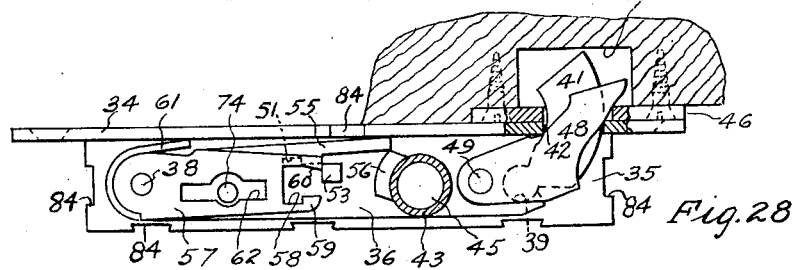

Figure 28 is a view similar to Figure 27 showing the bolts in locking and keeper engaging position, the keeper and part of the casing being shown in section.

Figure 29:
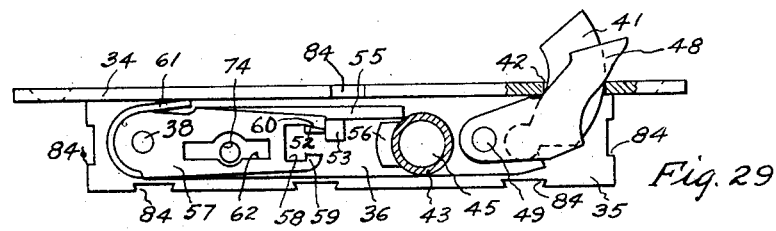

Figure 29 is a view similar to Figure 28 showing the latch members in bolt securing position.

Figure 30:
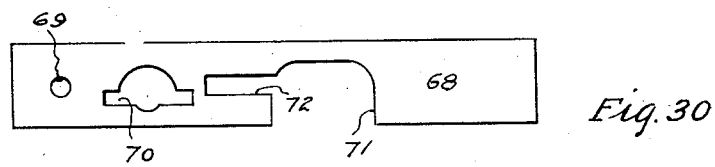

Figure 30 is a plan view of a securing plate to cover the working parts of the lock.

Figure 31:
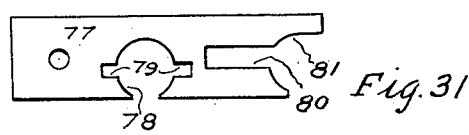

Figure 31 is a plan view of a plate to secure the key barrel in the lock casing.

Figures 32, 33:
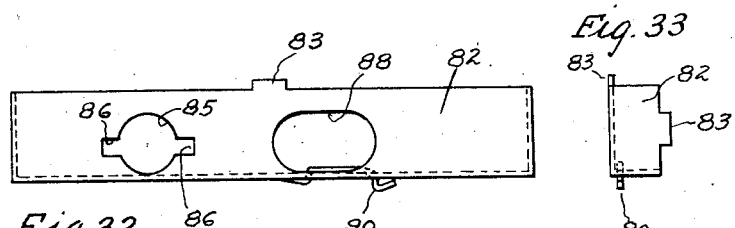

Figure 32 is a plan view of a member of the lock casing; and

Figure 33 is a view of the casing member looking at the right of Figure 32.

In carrying out the invention there is provided a casing comprising a pair of sections of right angle in cross section, one angle portion of one section being arranged as a face plate 34 having the ends extending beyond the other angle portion of the casing member and said ends perforated for the insertion of screws to secure the lock in a recess or mortise in the edge of a door with the face plate flush with the surface of the door edges. The lock mechanism is supported upon the other portion 35 constituting the bottom of the casing which is in contiguous relation to one side of the lock mortise when the lock is secured to the door.

The lock mechanism is particularly constructed for use in connection with the locking of sliding doors, and comprises a bolt carrier in the form of a plate 36 (Figure 12) slidably supported by and in contiguous relation to the casing member 35 and having at one end an elongated recess 37 to slidably engage a pin 38 fixed to and extending laterally of the member 35 to guide the plate 36 and limit the sliding movement thereof in one direction. The opposite end of said plate is arranged with an arcuate shaped recess 39 for the sidewise pivotal engagement of a similarly shaped portion 40 of a bolt 41 of the same thickness as the plate 36, (Figures 21 and 22,) and substantially of crescent shape extending at an oblique angle from the arcuate shaped end portion with the free end squared and the opposite edges thereof engaging the sides of an opening 42 of slightly greater length than the width of the bolt end in the face plate 34 adjacent one end thereof with the bolt end even with the surface of the face plate when the bolt carrying plate 36 is abutting the pin 38. The sliding of the plate 36 in a direction toward the opening 42 is effected by manually actuating a tubular member 43 arranged with an actuating knob 44 at one end and rotatably mounted on a post or support 45 extending laterally from the bolt actuator plate 36, and will force the bolt 41 through and beyond the face of casing member 34 in a direction to overhang the wall of the opening due to the arcuate shaped edge of the bolt and to enter an opening in a keeper, comprising a plate 46 spanning a recess 47 arranged in the edge of a door jamb or of another door in alinement with the opening 42 in the casing member 34 when the door is in full closed position, so that one side edge of the bolt will engage over an edge in the opening in the plate 46, as shown in Figure 28.

To prevent the forcing of the bolt 41 from its locking position in the keeper by moving the door, when the lock is used in connection with another sliding door, in a direction to the left of Figure 28, a second bolt 48 having the opposite edges of irregular formation is pivotally mounted on a pin 49 extending laterally from the plate 36 intermediate of the support 45 and arcuate recess 39 to extend in contiguous relation to the bolt 41 with the free end of bolt 48 squared similarly to the free end of the bolt 41 to engage the plate opening 42 which is of slightly greater width than the combined thickness of the two bolts and be even with the surface of the said plate when the bolt carrying plate 36 abuts the pin 38. The portion of the bolt 48 immediately of the free end thereof is of irregular tongue shape having the side edges curved so that when the bolt plate 36 is moved away from the pin 38, the said side edges will engage the sides of the opening 42 guiding the free end of the bolt in a direction opposite to the direction of movement of the bolt 41, as shown in Figures 14, 17, 28 and 29, to engage one of the side edges of bolt 48 over the side of the opening in the keeper plate 46 opposite to the side of said opening engaged by the curved side edge of bolt 41.

To releasably secure the bolts in locking and unlocked positions, particularly the locking position, a latch member in the form of a plate 50 is pivotally mounted at one end on the pin 38 juxtaposed to the bolt carrying plate 36 to have movement laterally of the plate 36 and the free end extended toward the actuator carrying post 45, and is arranged with a recess 51 having a restricted entrance thereto formed by ears 52 extending toward each other from the sides of the plate 50 at the entrance to the recess and terminating in spaced relation to each other with the space sufficient to permit the passage of a squared abutment or projection 53 extending laterally from the bolt plate 36 intermediate the sides thereof to be engaged by one of the ears 52, said engagement being maintained by a leaf spring 54 anchored at one end to the latch plate 50 and curved about the end of the said plate with the free end impinging against the inner surface of the face plate 34. When the bolts 41, 48 are in unlocked position the projection 53 is within the recess 51 with one of the ears 52 engaging the said projection, thus preventing the actuating of the bolts by sliding the bolt plate 36 in a direction toward the face plate opening 42. To release this engagement between the ear and projection the latch plate 50 has a portion 55 extended therefrom to be engaged by a cam projection 56 mounted and extending laterally from the tubular member 43 and of a length to position the space between the ears 52 of recess 51 in alinement with the projection 53 by the manipulating of the tubular member 43 by knob 44, (Figure 16) permitting the sliding of the bolt actuator plate in a direction toward the casing opening 42 and the actuating of the bolts through said opening. The bolts may be secured in keeper engaging position by permitting the latch plate 50 to assume its normal position under the influence of the spring 54 by turning the tubular member when one of the ears 52 will engage the projection 53 with the extended latch portion 55 abutting an adjacent side of the projection 53 and preventing the sliding of the bolt carrying plate in a direction away from the casing opening 42 and to unlocking position.

In the construction and arrangement of the lock so far described it may be actuated to locking condition through the rotating of member 43 by knob 44 to position plate projection 53 in line with the entrance to latch recess 51 and the longitudinal movement of the bolt plate in one direction.

In order that the lock may be operated to actuate the bolts to unlocking position by authorized persons, means are provided to render the bolt carrying plate inoperative and operative by a key K having the usual bit edge portion $b$. For this purpose a second latch plate 57 is pivotally mounted at one end upon the pin 38 juxtaposed to the first latch plate 50 with the opposite end arranged with a recess 58 having a restricted entrance similar to latch plate 50 by arranging an ear 59 of square cut, similarly to the ears 52, and sloping or inclining inward the inner edge of the opposite wall portion 60 of the recess and along which the bolt plate projection 53 slides when the bolt plate 36 is moved toward the casing member opening 42 with the latch plate 50 positioned with the space between the ears 52 in alinement with said projection 53, as shown in Figure 27. When the bolt carrying plate 36 has been actuated to move the bolts to locking position, which movement is limited by the bolts abutting the sides of the opening 42 and the opening in keeper plate 46, the end of latch plate 57 abuts the bolt plate projection 53 under the influence of a leaf spring 61 fixed at one end to the latch plate 57 and extended about the rounded end of the plate with the free end abutting against the inner surface of the casing member 34, similar to the spring 54, as shown in Figures 28 and 29. To move the latch plate 57 out of engagement with the projection 53 the latch 57 is moved against the tension of spring 61 by inserting key K through an elongated perforation 62 in the second latch 57 having a circular enlargement intermediate the ends to accommodate the body of the key in the turning thereof to actuate the second latch by the engagement of a predetermined portion of the bit $b$ with the wall of the perforation 62 and move the latch 57 toward the casing member 34 positioning the entrance to the recess therein in line with the bolt plate projection 53 and permit actuation of bolt plate 36 to disengage the bolts from the keeper by the movement of the manipulating member 43 in a direction toward the pin 38. The key is also employed in actuating the latch 50 and the bolt carrying plate 36 by the bit $b$ engaging the sides of an elongated perforation 63 in the first latch 50 in alinement with the perforation 62 in latch plate 57, said perforation having a circular enlargement intermediate the ends of the perforation similar to and of slightly larger radius than the circular enlargement of the perforation 62. The turning of the key will pivot the first latch 50 toward the casing member 34 and disengage the ear 52 from the bolt plate projection 53. The key slides the bolt carrying plate 36 by a predetermined portion of the bit b engaging a triangular shaped perforation 65 in the plate in alinement with the enlargements of perforations 62, 63, the sides of the said perforation being of arcuate form and the junctures of the sides with the bottom being also of arcuate shape, as shown at 66 in Figure 12, with the apex of the triangle of square formation, as at 67 in Figure 12, for the engagement of the portion of the key bit, as at Figure 9, to move the bolt carrying plate in the desired direction, the bit portion of the key leaving the square juncture 67 upon reaching the zenith of its movement and the movement of the bolt plate, as shown in Figure 14. The curvature of the sides 65 of the triangle permits of removal of the key.

To prevent the displacement of latches 50 and 57 due to the action of the springs 54 and 61, a displacement plate 68 is arranged with a perforation 69 adjacent one end of the plate to engage the pin 38, an elongated perforation 70 having an arcuate enlargement in alinement with the perforations 62, 63 and 65 for the passage of the key, and a recess 71 intermediate the ends of the plate for the free movement of the manipulating member 43 having an opening at the side opposite to the side adjacent the casing member 34 with the end of the recess adjacent the perforation 70 and extending from the opening of reduced width, as at 72, to permit free movement of the bolt plate projection 53. The plate 68 is juxtaposed to the latch plate 57 and the bolt 48.

To insure the proper engagement of the key with the perforations 62, 63 and 65, the key is engaged in and carried by a barrel having a shank 73 to pass through said perforations with one end of reduced diameter to engage a perforation 74 in the casing member 35, and the opposite end having an enlarged circular head 75 to abut the top of the sides of the perforation 70 of plate 68, with a slot 76 cut through the circumference of the shank and head to the center of the same for the passage of the edge of the key opposite the bit edge thereof, as shown in Figures 9 and 14. To secure the key barrel in position an additional plate 77 is mounted on the pin 38 juxtaposed to the plate 68 by engaging the pin in a perforation in said plate, and the plate is arranged with a circular perforation 78 intermediate the ends of the plate having an access to the side thereof opposite the side adjacent the casing member 34, for a purpose to be hereinafter described, with opposed recesses 79 extending longitudinally of the plate for the passage of the bit edge b of the key. The plate 77 also has an elongated recess 80 extended into the end opposite the perforated end to adjacent one of the recesses 79, and leading from an enlarged entrance 81 for the free movement of the bolt plate projection 53 and the manipulating member 43.

The lock elements assembled on the one casing member are enclosed by another casing member 82 of right angle form in cross section comprising the top, a side and the ends of the casing, the edges of the top, ends and side being arranged with tongues 83 for engagement with recesses 84 in the longitudinal edge of casing member 34 and in the longitudinal and end edges of casing member 35, the end walls of recesses in the longitudinal edge of member 35 being beveled and the cooperating tongues of casing member 82 being correspondingly formed for locking engagement therewith, the tongues being engaged by an edgewise movement of the tongues into said recesses 84 and secured therein by suitable means, as by soldering. The casing member 82 has a circular opening 85 with opposed recesses 86 extending longitudinally of the casing member similar to and in alinement with the perforation 78 and recesses 79 in plate 77. The access to the perforation 78 is for clearance of the key barrel head, and the opening 85 in casing member 82 is for the engagement and exposure of the key barrel head 75, the head being arranged at the juncture thereof with the shank 73 with an annular enlargement 87 to form a shoulder for engagement with casing member 82 about opening 85 to retain the key barrel in the casing and said shoulder held against the casing by the straight edge portion of perforation 70 in plate 68. The casing member 82 is arranged with an elongated opening 88 for the passage and movement of the manipulating member 43 to the outer end of which the knob 44 is secured by a pin 89, Figure 8. To prevent vertical movement of the manipulating member 43 and releasably mount the same in the casing the one angle portion of the casing member 82 has a slot extended therethrough adjacent the juncture of the angle of the casing and in alinement with the perforation 88.

A U-shaped detent 90 of resilient material is fixed at one end to the casing member at one end of the slot to normally position the U-portion through the slot into the casing to engage a transverse recess 91 in the actuator member 43 at the side of the cam projection 56. The free end of the detent 90 is arranged as a finger grip to facilitate the releasing of the detent from the slot 91 in the actuator member.

The carrying and actuating plate 36 for the locking bolts 41, 48 may be operated to move the locking bolts to locking position, as shown in Figures 14, 17, 28 and 29, by the actuating knob 44, or through the manipulation of the key K.

When actuated by the knob the knob is rotated to engage the cam projection 56 with the extended portion 55 of latch 50 to aline the entrance to the recess 51 in the latch with the plate projection 53, as shown in Figure 16, the inclined wall 60 of the recess in latch 57 engaging the plate projection 53, as shown in Figure 27. In this position of the latch 50 a force exerted on the knob to move the bolt carrying plate 36 in a direction toward the bolts will move the plate projection 53 out of latch recess 51 and project the bolts through the casing opening 42, as shown in Figure 17. By this movement of the plate 36 the projection 53 will ride along the inclined surface 60 of recess 58 in latch 57 and pass out through the entrance to said latch recess, the latch being moved on the pin 38 against the action of its spring 61, and as the projection 53 rides off inclined surface 60 the latch 57 will be moved by its spring 61 to engage the end of the latch in back of the plate projection 53, as shown in Figure 28. As the actuating knob is released the tension of spring 54 on latch 50 will effect a reverse rotation of the knob and engage the latch ear 52 at the juncture of the latch extension 55 with the latch in the rear of plate projection 53, as shown in Figure 29. The engagement of the latch ears 52 and the end of latch 57 in back of plate projection 53 will secure or lock the bolt carrying plate 36 against movement with the bolts in locking position. To actuate the plate 36 to move the bolts to unlocking position it is necessary to utilize the key K, which is engaged in the slot 76 of key barrel 73, the bit of the key co-operating during the initial movement thereof with the enlarged arcuate portions of the openings 62, 63 in the latches 50, 57 and moves said latches against the action of their springs to aline the accesses to the recesses in said latches with the plate projection 53. The continued rotation of the key maintains the latches in such position and by engagement of the key with the wall of opening 65 in plate 36, as shown in Figure 14, moves said plate in a direction opposite to the bolts from the Figure 14 position to that shown in Figure 9 and the bolts moved through the casing opening into the casing. To actuate the plate 36 to move the bolts to locking position by the key, the key is engaged in the slot of the key barrel in the position shown in full lines of Figure 9, and as it traverses to the dotted line positions the key bit will cooperate with the arcuate enlargements of the openings in the latches to move the latches against the action of their springs to aline the accesses to the recesses in the latches with the plate projection 53. As the key moves from the second dotted line position in Figure 9 to the full line position in Figure 14 the plate 36 is actuated to project the locking bolts through the casing opening, and as the key assumes the dotted line position in Figure 14 it will ride off the arcuate portions of the openings in the latches and the latches will be positioned by the springs to engage the latch ears in back of the plate projection 53, as shown in Figure 29, locking the bolt plate 36 against movement, when the key is withdrawn.

It will be obvious that various modifications may be made in the construction and arrangement of the parts, and that portions may be used without others without departing from the scope of the invention.

Having thus described my invention, I claim:

1. In a lock, a casing arranged with an opening in one edge portion thereof, bolt mechanism slidably mounted in the casing to have movement on the longitudinal axis of the casing and through the casing opening, a pivoted latch member yieldingly urged into engagement with the bolt mechanism to retain the said mechanism in predetermined positions, means rotatably carried by the bolt mechanism to actuate the latch member to release the latch member from engagement with the bolt mechanism and move the bolt mechanism relative to the casing opening, and a second pivoted latch member yieldingly urged into engagement with the bolt mechanism to retain the same in one of the predetermined positions thereof, and said second latch member arranged to be actuated by a removable key to release the same from and permit the bolt mechanism to be actuated from the said predetermined position.

2. A lock as claimed in claim 1, wherein the first latch is also operative by the key with the second latch member simultaneously to actuate the latch members to release the same from and actuate the bolt mechanism.

3. A lock as claimed in claim 1, wherein the second latch member comprises a plate pivotally mounted in the casing arranged at one end with a recess having a restricted entrance, a spring fixed to urge the plate with a portion of the entrance of the recess to engage a projection of the bolt-mechanism, and the plate having a perforation adapted to be engaged by the key releasably supported in the casing to actuate the latch plate to release the entrance portion of the recess from the projection of the bolt mechanism and permit actuation of the bolt-mechanism.

4. In a lock, a casing arranged with an opening in the side wall thereof, bolt mechanism comprising a plate mounted in the casing with one edge juxtaposed to the casing wall with the opening to have longitudinal reciprocatory sliding movement in the casing, a bolt member pivotally mounted at one end in one end of the plate to extend beyond and in the plane of the plate, and a second bolt pivotally mounted at one end on the plate juxtaposed to the first bolt, the free end edges of said bolts in the unlocking position of the plate extending in parallel relation to each other and the edge of the plate juxtaposed to the casing wall with the opening and engaging the casing opening flush with the outer face of the casing, and said bolts adapted to be projected laterally of the plate through the casing opening and laterally of each other in a direction longitudinally of the plate to locking position by the movement of the plate in one direction, and toward each other and into the opening in position with the end edges flush with the casing face as the plate is moved in the opposite direction to unlocking position.

5. In a lock, a casing of rectangular shape in cross section having an opening in a side wall thereof, bolt mechanism comprising a plate mounted in the casing with one longitudinal edge juxtaposed to the casing wall with the opening to have sliding movement longitudinally of the casing, and a pair of juxtaposed bolts pivotally mounted at one end on and extending beyond the end of the plate with the free ends extended into the casing opening and in the normal unlocking position flush with the outer face of the casing, the movement of said plate in one direction projecting the bolts through the casing opening to locking position and movement of the plate in the opposite direction moving the bolts into the casing opening to unlocking position, a pivoted latch plate yieldingly urged to a predetermined position to co-operate with an abutment extended from a face of the bolt carrying plate to retain the bolt mechanism in predetermined positions, an actuator extended through an opening in the casing and rotatably connected with the bolt carrying plate, and a cam carried by said actuator to co-operate with an extended portion of the latch plate to actuate the latch plate to release the same from the bolt mechanism and the actuator adapted to impart longitudinal movement to the bolt carrying plate.

6. In a lock, a casing of rectangular shape in cross section having an opening in the side wall thereof, bolt mechanism comprising a plate mounted in the casing with one longitudinal edge juxtaposed to the casing wall with the opening to have sliding movement longitudinally of the casing, and a pair of juxtaposed bolts pivotally mounted at one end on and extending beyond the end of the plate with the free ends extended into the casing opening and in the normal unlocking position flush with the outer face of the casing, the movement of said plate in one direction projecting the bolts through the casing opening to locking position and movement of the plate in the opposite direction moving the bolts into the casing opening to unlocking position, a pair of pivoted latch plates juxtaposed relative to each other and a face of the bolt carrying plate yieldingly urged to predetermined position relative to an abutment extended from said face of the bolt carrying plate, one latch plate arranged to permit of movement of the bolt carrying plate to locking position and releasably retain the bolt carrying plate in locking position, and the other latch plate arranged to releasably retain the bolt carrying plate in either locking or unlocking position, an actuator extended through an opening in the casing and rotatably connected with the bolt carrying plate, a cam carried by said actuator to cooperate with an extended portion of the other latch plate to release said plate from the bolt plate abutment and adapt the bolt mechanism to be moved to locking position by the actuator, and both latches adapted to be actuated to allow movement of the bolt mechanism from locking position by a removable key, and said other latch plate being also operable by said key to release the bolt plate for locking movement by the key.

7. A lock as claimed in claim 4, wherein the bolt members comprise plates having the opposite edges arranged as cam edges to engage opposite walls of the casing opening to transmit the longitudinal movement of the plate in one direction to rotary movement of the bolt members and move the bolt members laterally of the movement of the plate through the casing opening and guide the bolts in opposite directions laterally of each other into overhanging relation to the walls of the casing opening.

8. In a lock as claimed in claim 4, an abutment extended from a face of the bolt carrying plate intermediate the ends and side edges thereof, a latch plate pivoted at one end in the casing at one end of the bolt carrying plate to extend contiguous to and parallel with said bolt carrying plate toward the plate abutment, said latch plate having a recess in the free end adapted for the engagement of the plate abutment in the locking position thereof and cooperate with the plate abutment to releasably retain the bolt carrying plate in locking and unlocking positions and having a portion extended beyond the recessed end, an actuator for the bolt carrying plate extended into an opening in the casing and rotatably connected with the bolt carrying plate to co-operate with the extension of the latch plate to position the latch plate with the recess in alinement with the plate abutment to permit of longitudinal movement of the bolt carrying plate and impart longitudinal movement to said plate, and said latch plate and bolt carrying plate adapted for actuation by a removable key to release the latch plate from and impart longitudinal movement to the bolt carrying plate.

Signed at the borough of Queens in the county of Queens and State of New York this 10th day of October, 1929.

ALBERT VOIGT.